United States Patent

McNamara

[19]

[11] Patent Number: 6,016,799

[45] Date of Patent: Jan. 25, 2000

[54] VORTEX CHAMBER FOR DEEP FRYER HEAT EXCHANGER

[75] Inventor: Albert Charles McNamara, San Antonio, Tex.

[73] Assignee: AFC Enterprises, Inc., Atlanta, Ga.

[21] Appl. No.: 09/224,201

[22] Filed: Dec. 30, 1998

[51] Int. Cl.[7] .................................................. A47J 27/00
[52] U.S. Cl. ............................................ 126/391; 99/403
[58] Field of Search .............................. 138/38; 126/391; 99/403

[56] References Cited

U.S. PATENT DOCUMENTS

| | | | |
|---|---|---|---|
| 3,769,959 | 11/1973 | Parker | 138/38 |
| 4,481,873 | 11/1984 | Keating | 99/403 |
| 5,397,179 | 3/1995 | Berlin et al. | 138/38 |
| 5,417,202 | 5/1995 | Cote | 126/391 |
| 5,421,715 | 6/1995 | Hofstetter et al. | 138/38 |
| 5,706,717 | 1/1998 | Barner | 99/330 |
| 5,901,641 | 5/1999 | McNamara | 99/403 |

*Primary Examiner*—Carroll Dority
*Attorney, Agent, or Firm*—Banner & Witcoff, Ltd.

[57] ABSTRACT

A heat exchanger has a plurality of heat transfer conduits and a heating means for heating fluid flowing through the heat transfer conduits. At least one vortex chamber has at least one inlet opening, at least one outlet opening, and, preferably, at least one baffle positioned therein. A first portion of at least one heat transfer conduit is sealingly connected to a respective inlet opening of a vortex chamber. A second portion of the at least one heat transfer conduit is sealingly connected to a respective outlet opening of the vortex chamber. The vortex chamber has a cross sectional area larger than the cross sectional area of the heat transfer conduit to which it is connected.

11 Claims, 5 Drawing Sheets

VORTEX CHAMBER FOR DEEP FRYER HEAT EXCHANGER

The present invention relates to a deep fryer, and more particularly, to a deep fryer having an improved heat exchanger.

BACKGROUND

Deep fryers are commercially used by restaurants, institutional kitchens, and fast food establishments for cooking a variety of food products, such as french fries, fish, fried chicken, and the like. The food product is cooked by totally immersing it within a vat or tank that is filled with heated oil or shortening. The oil may be heated using a flow of heated fluid, or gas, that is forced or drawn through a heat exchanger having flow passages that are located within or external to the cooking vat. A gas burner is provided to heat the gas circulating within the heat exchanger.

Generally, in such deep fryers, the heated fluid flows through the flow passages from an inlet to an outlet before being exhausted into the atmosphere. Some of the heating systems of the prior art can be extremely inefficient, however, and the average temperature of the exhaust gas is still extremely hot, on the order of 1200° F. Due to the relatively short period of time in which the heated fluid actually remains within the flow passages, the heat transfer to the cooking oil is thereby limited, and potentially usable heating energy is wasted by being exhausted into the atmosphere.

U.S. Pat. No. 5,417,202, assigned on its face to America's Favorite Chicken Company (AFC) discloses a heat exchanger for a deep fryer having a plurality of heat transfer tubes connected to a pair of mixing plenums. The mixing plenums increase turbulence and thoroughly mix the heat transfer fluid which is carried through the tubes into the mixing plenums and exits the mixing plenums in a direction 180° from the direction it entered.

It is an object of the present invention to provide a deep fryer having an improved heat exchanger which reduces some or all of the aforesaid difficulties inherent in prior known devices and enhances heat transfer to the cooking oil. Particular objects and advantages of the invention will be apparent to those skilled in the art, that is, those who are knowledgeable or experienced in this field of technology, in view of the following disclosure of the invention and detailed description of certain preferred embodiments.

SUMMARY

The principles of the invention may be used to advantage to provide a heat exchanger which enhances the heat transfer of the heating fluid passing through the heat exchanger.

In accordance with a first aspect, a heat exchanger for a fryer system has at least one heat transfer conduit and at least one vortex chamber. Each vortex chamber has an inlet opening and an outlet opening. One portion of a heat transfer conduit is sealingly connected to the inlet opening and a different portion of the heat transfer conduit sealingly connected to the outlet opening. The vortex chamber has a cross sectional area which is larger than a cross sectional area of the heat transfer conduit to which it is connected. A heating means heats fluid flowing into the at least one heat transfer conduit.

In accordance with another aspect, a heat exchanger for a fryer system has at least one heat transfer conduit, with each conduit having a longitudinal axis. The heat exchanger has at least one vortex chamber. Each vortex chamber has an inlet opening and an outlet opening. One portion of a heat transfer conduit is sealingly connected to the inlet opening and a different portion of the heat transfer conduit is sealingly connected to the outlet opening. The vortex chamber has a greater dimension than the heat transfer conduit to which it is connected in a direction transverse to the longitudinal axis of the heat transfer conduit. A heating means heats fluid flowing into the at least one heat transfer conduit.

In accordance with yet another aspect, a heat exchanger for a fryer system has at least one heat transfer conduit, with each conduit having a longitudinal axis. The heat exchanger has at least one vortex chamber. Each vortex chamber has a plurality of inlet openings and a plurality of outlet openings. Portions of respective heat transfer conduits are connected to respective inlet openings and outlet openings of the vortex chamber. A heating means heats fluid flowing into the at least one heat transfer conduit.

In accordance with another aspect, a heat exchanger for a fryer system has a plurality of heat transfer conduits, with each heat transfer conduit having an inlet end and an outlet end. A heating means heats gas flowing into the plurality of heat transfer conduits. The heat exchanger has at least one mixing plenum having a plurality of inlet openings and a plurality of outlet openings. The heat exchanger has at least one vortex chamber having at least one baffle disposed therein, at least one inlet opening and at least one outlet opening. A first portion of at least one of the heat transfer conduits is sealingly connected to an inlet opening of the at least one vortex chamber and a second portion of the at least one of the heat transfer conduits is sealingly connected to an outlet opening of the at least one vortex chamber.

In accordance with yet another aspect, a heat exchanger for a fryer system has a first plenum having at least one inlet opening and a plurality of outlet openings. A mixing plenum has a plurality of inlet openings and a plurality of outlet openings. A plurality of heat transfer conduits each have an inlet end and an outlet end. A heating means heats fluid flowing into at least one of the heat transfer conduits. A first vortex chamber is positioned between the plenum and the mixing plenum and has a plurality of baffles disposed therein, a plurality of inlet openings, and a plurality of outlet openings. First portions of respective heat transfer conduits are connected at first ends thereof to respective outlet openings of the first plenum and at second ends thereof to respective inlet openings of the first vortex chamber. Second portions of the respective heat transfer conduits are connected at first ends thereof to respective outlet openings of the first vortex chamber and at second ends thereof to respective inlet openings of the mixing plenum. A second vortex chamber has a plurality of baffles disposed therein, a plurality of inlet openings, and a plurality of outlet openings. First portions of respective heat transfer conduits are connected at first ends thereof to respective outlet openings of the mixing plenum and at second ends thereof to respective inlet openings of the second vortex chamber. Second portions of the respective heat transfer conduits are connected at first ends thereof to respective outlet openings of the second vortex chamber.

From the foregoing disclosure, it will be readily apparent to those skilled in the art, that is, those who are knowledgeable or experienced in this area of technology, that the present invention provides a significant technological advance. Preferred embodiments of the vortex chambers for a deep fryer heat exchanger can further increase turbulence and residence time and thus, enhance heat transfer for the heat exchanger. These and additional features and advantages of the invention disclosed here will be further understood from the following detailed disclosure of certain preferred embodiments.

BRIEF DESCRIPTION OF THE DRAWINGS

Certain preferred embodiments are described in detail below with reference to the appended drawings wherein.

Figure 1:
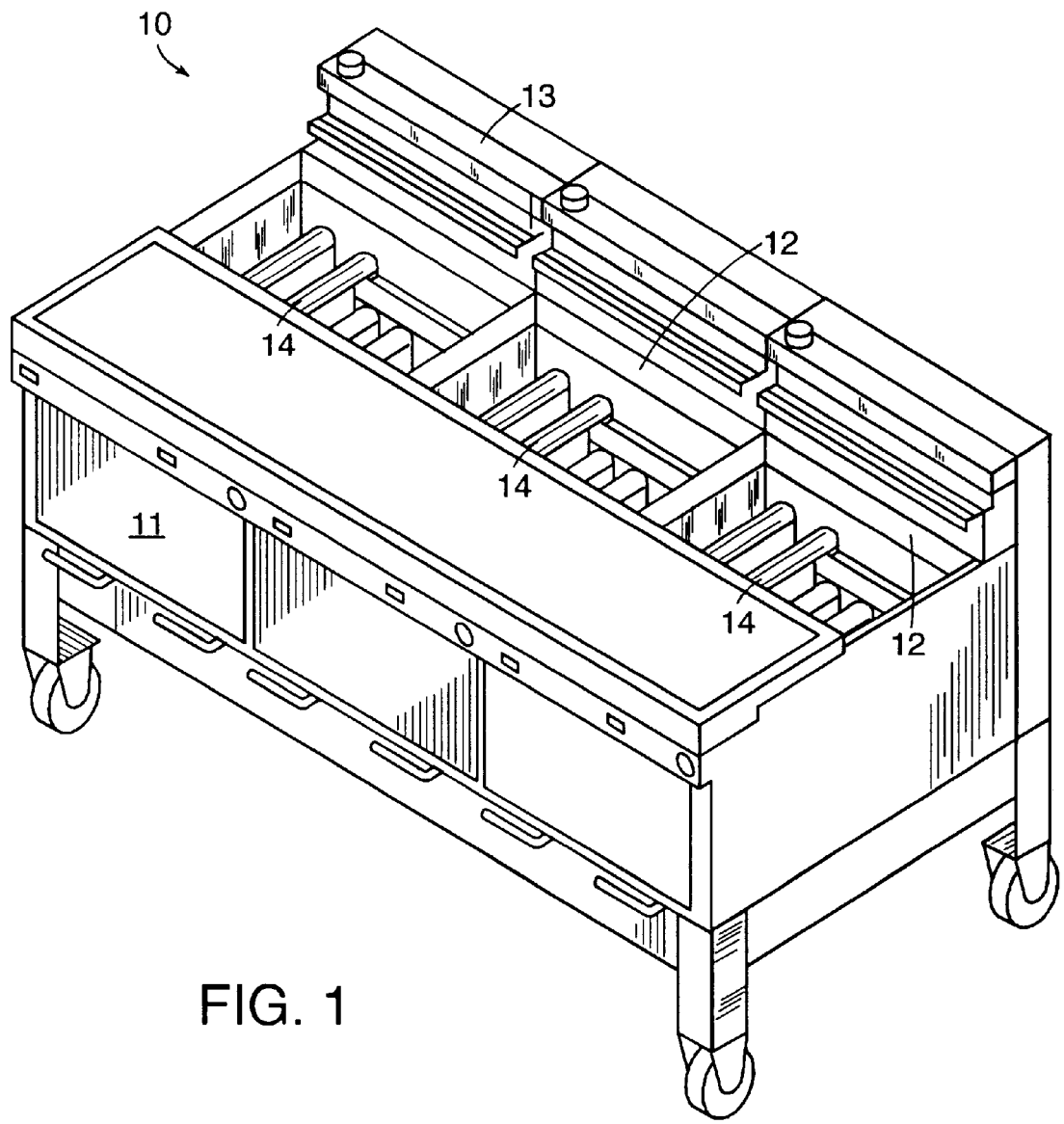
FIG. 1 is a schematic perspective view of a gas fryer containing a heat exchanger according to the present invention.

The figures referred to above are not drawn necessarily to scale and should be understood to present a representation of the invention, illustrative of the principles involved. Some features of the vortex chamber for a deep fryer heat exchanger depicted in the drawings have been enlarged or distorted relative to others to facilitate explanation and understanding. The same reference numbers are used in the drawings for similar or identical components and features shown in various alternative embodiments. Vortex chambers for deep fryer heat exchangers, as disclosed herein, will have configurations and components determined, in part, by the intended application and environment in which they are used.

DETAILED DESCRIPTION OF CERTAIN PREFERRED EMBODIMENTS

Referring to FIG. 1, a gas fryer according to the present invention is shown generally by reference numeral 10. The gas fryer preferably includes a plurality of vats 12 for holding the shortening, oil, or other cooking medium, a heat exchanger 14 for heating the shortening in each vat 12, a burner section 11 for heating the fluid flowing through heat exchanger 14, and may include a blower motor in blower housing 13 for drawing the heated fluid through heat exchanger 14. Due to its efficiency and economic availability, the heat exchange fluid generally used in the present invention and in prior art gas fryers is air, however, other gaseous fluids or liquids may of course also be considered as the development thereof permits.

Figure 2:
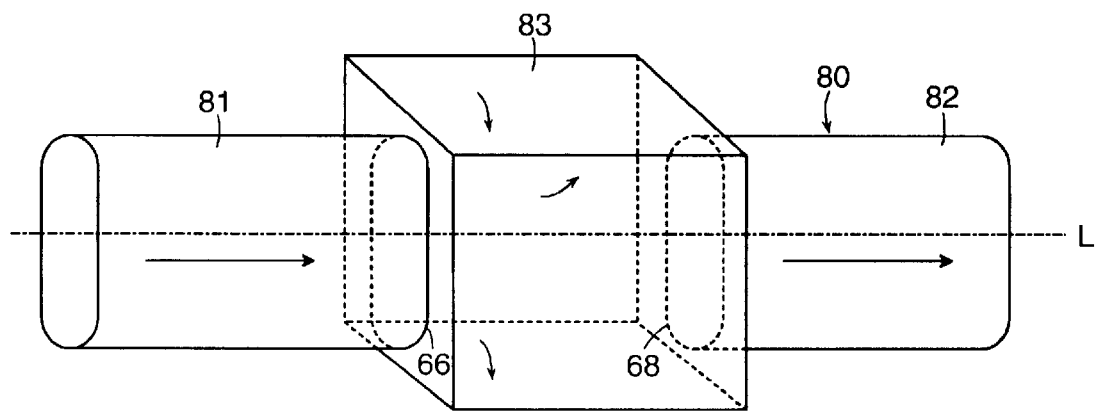
FIG. 2 is a schematic perspective view of a vortex chamber of the heat exchanger of FIG. 1.

In one preferred embodiment, heat exchanger 14 includes at least one heat transfer conduit or tube 80, shown in FIG. 2, formed of a first portion 81 and a second portion 82. Heat transfer tube 80 is preferably oblong or obround, having a cross sectional shape of a flattened cylinder with parallel sides and curved ends. This configuration of heat transfer tube 80 creates a larger surface area than a conventional circular tube. It is to be appreciated that heat transfer tube 80 may, in other preferred embodiments, have a circular, oblong or other suitable cross sectional shape.

A vortex chamber 83 has an inlet opening 66 and an outlet opening 68. First portion 81 is connected at one end thereof to inlet opening 66 of vortex chamber 83 and at its other end (not shown) to a sidewall of vat 12. Second portion 82 is connected at one end thereof to outlet opening 68 of vortex chamber 83 and at its other end (not shown) to a sidewall of vat 12. Thus, vortex chamber 83 is in-line with heat transfer tube 80.

Vortex chamber 83 has a cross sectional area which is larger than the cross sectional area of heat transfer tube 80. In the embodiment illustrated, vortex chamber 83 has a greater dimension than heat transfer tube 80 in all directions transverse to longitudinal axis L. It is to be appreciated that vortex chamber 83 will have a greater dimension than heat transfer tube in at least one direction transverse to longitudinal axis L. The direction of travel of the heated fluid is schematically illustrated in FIG. 2 to show the heated fluid traveling through first portion 81, into vortex chamber 83 where it is churned, and then through second portion 82. Such churning increases the turbulence of the heated fluid, thereby enhancing the heat transfer. Heat transfer is also enhanced since vortex chamber 83 has a larger surface area per unit length than heat transfer tube 80. It is believe that the increase in cross-sectional area of the flow path as the fluid flows from heat transfer tube 80 into vortex chamber 83 results in a decrease of the flow velocity of the fluid. This serves to increase the residence time of the fluid in the heat exchanger, which further enhances heat transfer. Vortex chamber 83 is preferably located midway along the length of heat transfer tube 80 so as optimize the heat transfer. In certain preferred embodiments, a plurality of vortex chambers 83 may be provided along the length of heat transfer tube 80.

Figure 3:
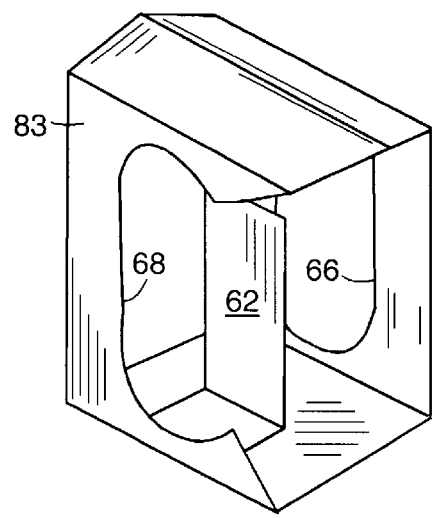
FIG. 3 is a schematic perspective view, shown partially cut away, of the vortex chamber of FIG. 2 having a baffle disposed therein.

In another preferred embodiment, shown in FIG. 3, a baffle 62 is positioned within vortex chamber 83, providing additional churning which increases turbulence, and, therefore, enhances heat transfer. Baffle 62 is preferably placed directly in the flowstream of heated fluid flowing through heat transfer tube 80. Baffle 62 serves to disrupt the flow of heated fluid, further increasing turbulent flow within vortex chamber 83 and enhancing the heat transfer. Thus, in this embodiment, as shown by the arrows, heated fluid enters vortex chamber 83, encounters baffle 62, is thoroughly churned, and exits vortex chamber 83, leaving vortex chamber 83 traveling in the same direction as it entered.

In a preferred embodiment, baffles 62 are formed of a substantially flat piece of material, such as metal, bent into an L-shape, with its lower leg secured, such as by welding, to a lower surface of vortex chamber 83. Baffles 62 are positioned between inlet opening 66 and outlet opening 68 where first portion 81 and second portion 82 are secured, respectively.

Figure 4:
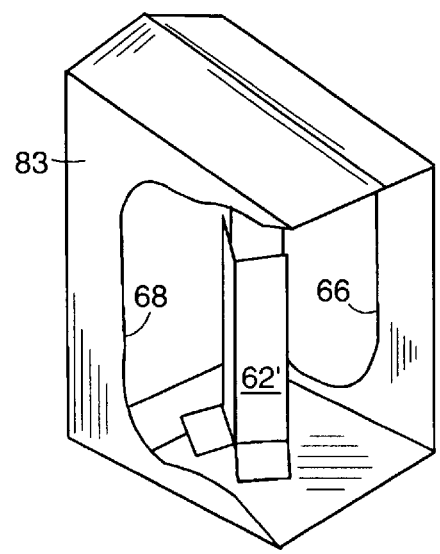
FIG. 4 is a schematic perspective view, shown partially cut away, of the vortex chamber of FIG. 2 having an alternative embodiment of a baffle disposed therein.

In another preferred embodiment, shown in FIG. 4, baffle 62' may have a substantially V shaped profile, with the apex of its V shape projecting upstream into the flow of heated fluid passing through the vortex chamber to further disrupt the heated fluid.

Figure 5:
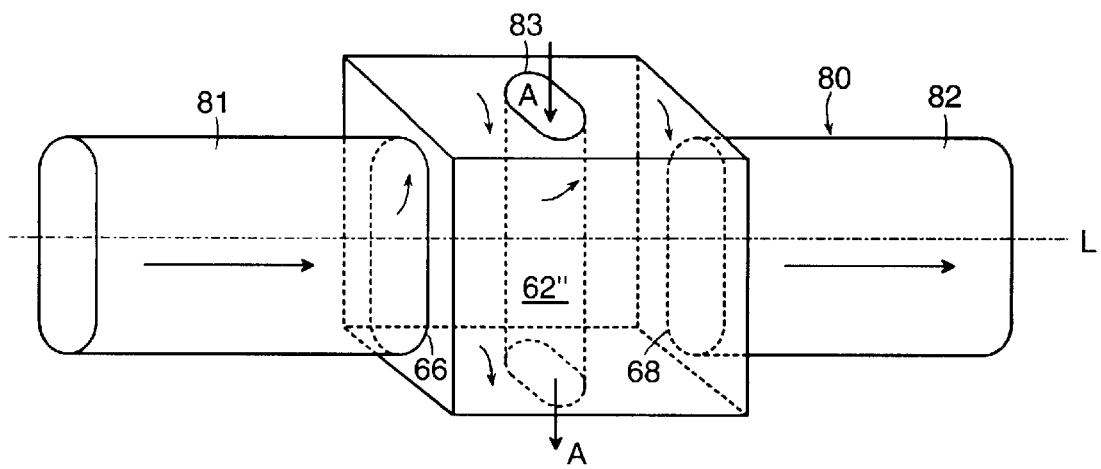
FIG. 5 is a schematic perspective view of an alternative embodiment of the vortex chamber of the heat exchanger of FIG. 1.

In another preferred embodiment, shown in FIG. 5, baffle 62" may be formed as a conduit, secured at its respective ends to a first and second surface of vortex chamber 83, creating a passageway through which shortening may pass (as seen by the arrows A). Baffle 62", therefore, disrupts the flow of heated fluid passing through vortex chamber 83, while also allowing shortening to pass through the passageway formed by baffle 62", creating additional surface area for the transfer of heat from the heated fluid to the shortening in the vat.

Figure 6:
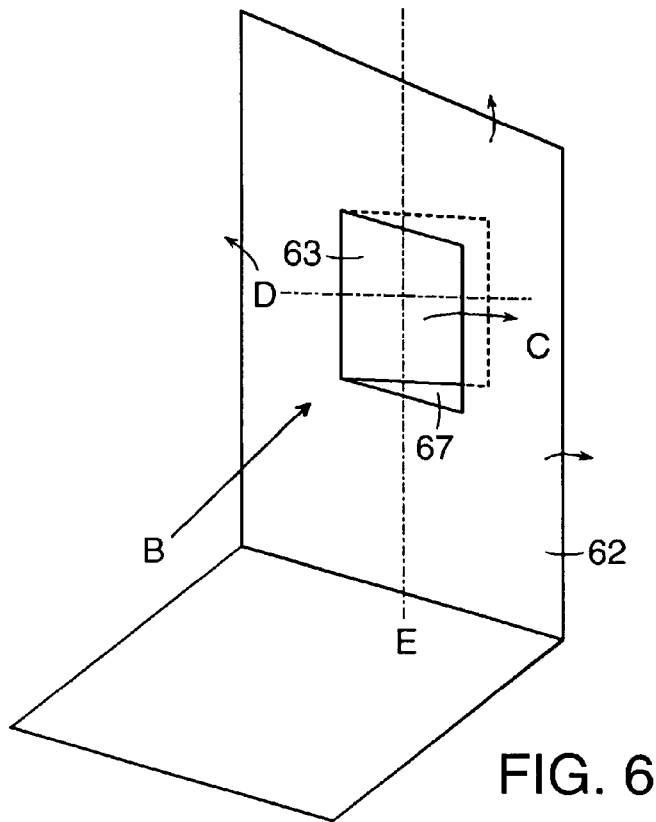
FIG. 6 is a schematic perspective view of an alternative embodiment of the baffle of FIG. 3.

In another preferred embodiment, as shown in FIG. 6, baffle 62 may be provided with tab 63. Tab 63 is formed by cutting baffle 62 and bending the cut portion of baffle 62 outwardly so as to form an opening 67 through which heated fluid will flow. Thus, tab 63 extends outwardly from the surface of baffle 62, preferably in the direction of the flow of heated fluid which is shown by arrow B. Some of the heated fluid passes through opening 67, as shown by arrow C, while the remaining heated fluid is diverted around the periphery of baffle 62.

Figure 7:
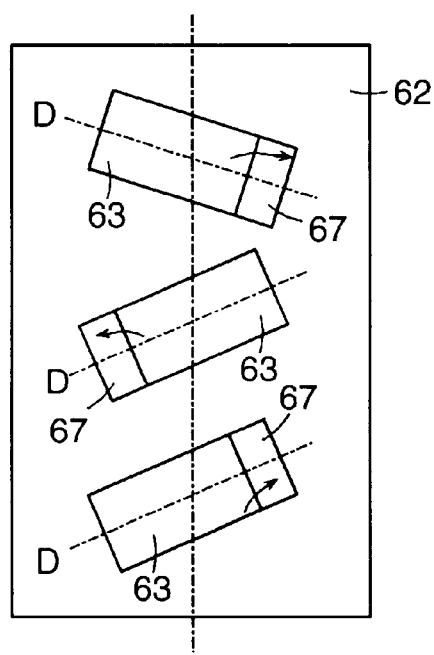
FIG. 7 is a schematic elevation view of an alternative embodiment of the baffle of FIG. 3.

As seen in FIG. 7, baffle 62 may be provided with a plurality of tabs 63. In certain preferred embodiments, tabs 63 may be angled with respect to baffle 62. Specifically, the longitudinal axis D of each tab 63 may be at an angle with respect to the longitudinal axis E of baffle 62. In FIG. 6, longitudinal axis D is perpendicular to longitudinal axis E, while in FIG. 7 the longitudinal axes D are at an acute angle to longitudinal axis E. Consequently, the heated fluid which flows through openings 67 can be directed upwardly, downwardly, or in any desired direction with respect to its original flow direction, simply by angling tab 63 to a desired orientation.

Figures 8, 9:
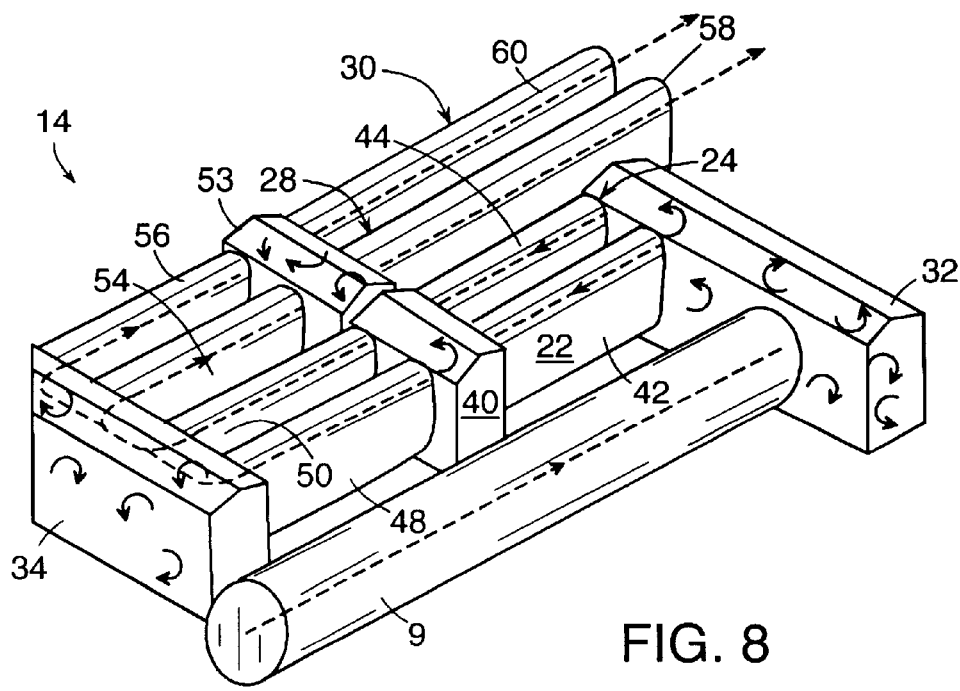
FIG. 8 is a schematic perspective view of one embodiment of the heat exchanger shown in FIG. 1 having two vortex chambers.
FIG. 9 is a schematic perspective of another embodiment of the heat exchanger shown in FIG. 1 having three vortex chambers.

In certain preferred embodiments, separate vortex chambers which are positioned in-line with parallel heat transfer tubes may be combined to form one larger vortex chamber. An illustration of such an embodiment is shown in FIG. 8, where heat exchanger 14 includes an inlet heat transfer conduit or tube 9, mixing heat transfer tubes 22, 24; outlet heat transfer tubes 28, 30; plenum 32, and mixing plenum 34. The direction of travel of the heated fluid through heat exchanger 14 is schematically illustrated in FIG. 8 to show the heated fluid entering the vat through inlet heat transfer tube 9, churning in plenum 32, passing through mixing heat transfer tubes 22, 24, mixing in plenum 34, and then exiting the vat through outlet heat transfer tubes 28, 30. The heated fluid is, therefore, redirected when it enters plenums 32, 34 in a direction which is 180° from its original direction. Heat transfer tube 9 preferably has a circular cross section. Plenums 32, 34 have a generally rectangular cross section and extend almost the entire width of heat exchanger 14. Thus, the large exposed surface area of heat transfer tubes 9, 22, 24, 28, 30 plenum 32, and mixing plenum 34 within vat 12 provides increased heat transfer from the heating fluid passing through heat exchanger 14 to the shortening within vat 12. In a preferred embodiment of the present invention, gas fryer 10 includes a vat 12 having internal dimensions of 20"×20", 18"×18", or 14"×14", although any other desired dimensions could also be used. Heat exchanger 14 is therefore correspondingly sized to be disposed within vat 12. A further description of the heat exchanger is provided in U.S. Pat. Nos. 5,417,202 and 5,706,717, assigned on their faces to America's Favorite Chicken Company (AFC), the entire contents of which are hereby incorporated by reference.

As seen in FIG. 8, vortex chamber 40 is positioned between plenum 32 and mixing plenum 34, in-line with mixing heat transfer tubes 22 and 24. Mixing heat transfer tubes 22, 24 are formed of first portions 42, 44 respectively, and second portions 48, 50, respectively. First portions 42, 44 are connected at first ends thereof to outlet openings of plenum 32 and at second ends thereof to inlet openings 66 of vortex chamber 40. Second portions 48, 50 are connected at first ends thereof to outlet openings 68 of vortex chamber 40 and at second ends thereof to inlet openings of mixing plenum 34.

Another vortex chamber 53 is positioned in-line with outlet heat transfer tubes 28, 30. Outlet heat transfer tubes 28, 30 are formed of first portions 54, 56, and second portions 58, 60, respectively. First portions 54, 56 are connected at first ends thereof to outlet openings of mixing plenum 34 and at second ends thereof to inlet openings 66 of vortex chamber 53. Second portions 58, 60 are connected at first ends thereof to outlet openings 68 of vortex chamber 53 and at second ends thereof to a sidewall (not shown) of vat 12.

Baffles 62, as described above, are preferably disposed within vortex chambers 40, 53. Baffles 62 are preferably placed directly in the flowstream of heated fluid flowing from the heat transfer tubes and through the vortex chambers. Baffles 62 serve to disrupt the flow of heated fluid, further increasing turbulent flow within vortex chambers 40 and 53 which, in turn, enhances the heat transfer. Thus, in this embodiment, heated fluid enters vortex chamber 40, encounters baffles 62, is thoroughly churned, and exits vortex chamber 40, leaving vortex chamber 40 traveling in the same direction as it entered. By placing vortex chamber 40 between plenum 32 and mixing plenum 34, and placing vortex chamber 53 downstream of mixing plenum 34, additional turbulence is introduced part way along the stream of heated fluid flowing through the heat transfer tubes 22, 24, 28, 30. Vortex chambers 40, 53 are preferably located midway along the lengths of the respective heat transfer tubes so as optimize the heat transfer.

Vortex chambers 40, 53 preferably have a cross sectional area which is larger than the cross sectional area of the heat transfer tubes to which they are connected. As the heating fluid flows from the heat transfer tubes into the vortex chambers 40, 53, the space within which the heating fluid is contained gets larger, allowing the heating fluid to expand, creating additional turbulence, decreasing the velocity of the heating fluid and enhancing heat transfer. Thus, additional turbulence and enhanced heat transfer is provided both by baffles 62 and by the increased cross sectional area of vortex chambers 40, 53 as compared to the heat transfer tubes to which they are connected.

Turning to FIG. 9, another embodiment of the present invention is shown having an additional vortex chamber 65. In the embodiment of FIG. 9, heat exchanger 14 includes a plurality of inlet heat transfer tubes 16, 18, 20; mixing heat transfer tubes 22, 24, 26; outlet heat transfer tubes 28, 30; mixing plenums 32, 34; and vortex chambers 40, 53, and 65. Vortex chamber 65 is positioned between the sidewall of vat 12 and mixing plenum 32, in-line with inlet heat transfer tubes 16, 18, 20. Inlet heat transfer tubes 16, 18, 20 are formed of first portions 13, 15, 17, respectively, and second portions 21, 23, 25, respectively. Similarly vortex chamber 40 is in-line with mixing heat transfer tubes 22, 24, 26 and positioned between first portions 42, 44, 46 thereof, respectively, and second portions 48, 50, 52 thereof, respectively. Vortex chamber 53 has the same configuration as that described with respect to FIG. 2 above. Baffles 62 are preferably disposed in each of vortex chambers 40, 53, and 65.

In light of the foregoing disclosure of the invention and description of the preferred embodiments, those skilled in this area of technology will readily understand that various modifications and adaptations can be made without departing from the true scope and spirit of the invention. All such modifications and adaptations are intended to be covered by the following claims.

I claim:

1. A heat exchanger for a fryer system comprising, in combination:

at least one heat transfer conduit;

at least one vortex chamber, each vortex chamber having an inlet opening and an outlet opening, one portion of a heat transfer conduit sealingly connected to the inlet opening and a different portion of the heat transfer conduit sealingly connected to the outlet opening, the vortex chamber having a cross sectional area which is larger than a cross sectional area of the heat transfer conduit to which it is connected;

heating means for heating fluid flowing into the at least one heat transfer conduit; and a baffle disposed within the at least one vortex chamber.

2. The heat exchanger according to claim 1, wherein the baffle is a substantially planar member extending from a surface of the at least one vortex chamber, a planar surface of the baffle being substantially perpendicular to a flow of heating fluid passing into the at least one vortex chamber.

3. The heat exchanger according to claim 1, further comprising at least one tab, each tab formed by cutting a portion of the baffle and bending the cut portion outwardly away from a surface of the baffle in the direction of a flow of heating fluid passing into the at least one vortex chamber.

4. The heat exchanger according to claim 3, wherein a longitudinal axis of at least one tab is at an acute angle with respect to a longitudinal axis of the baffle.

5. The heat exchanger according to claim 1, wherein the at least one baffle comprises a conduit connecting a first surface of the at least one vortex chamber to a second surface of the at least vortex chamber.

6. A heat exchanger for a fryer system comprising, in combination:

at least one heat transfer conduit, each conduit having a longitudinal axis;

at least one vortex chamber, each vortex chamber having an inlet opening and an outlet opening, one portion of a heat transfer conduit sealingly connected to the inlet opening and a different portion of the heat transfer conduit sealingly connected to the outlet opening, the vortex chamber having a greater dimension than the heat transfer conduit to which it is connected in a direction transverse to the longitudinal axis of the heat transfer conduit;

heating means for heating fluid flowing into the at least one heat transfer conduit; and a baffle disposed within the at least one vortex chamber.

7. The heat exchanger according to claim 6, wherein the at least one vortex chamber has a greater dimension than the heat transfer conduit to which it is connected in more than one direction which is transverse to the longitudinal axis of the heat transfer conduit.

8. The heat exchanger according to claim 6, wherein the at least one vortex chamber has a greater dimension than the heat transfer conduit to which it is connected in all directions which are transverse to the longitudinal axis of the heat transfer conduit.

9. A heat exchanger for a fryer system comprising, in combination:

at least one heat transfer conduit, each conduit having a longitudinal axis;

at least one vortex chamber, each vortex chamber having a plurality of inlet openings and a plurality of outlet openings, portions of respective heat transfer conduits being connected to respective inlet openings and outlet openings of the vortex chamber;

heating means for heating fluid flowing into the at least one heat transfer conduit; and at least one baffle disposed within the at least one vortex chamber.

10. A heat exchanger for a fryer system comprising, in combination:

a plurality of heat transfer conduits, each having an inlet end and an outlet end;

a heating means for heating gas flowing into the plurality of heat transfer conduits;

at least one mixing plenum having a plurality of inlet openings and a plurality of outlet openings;

at least one vortex chamber having at least one baffle disposed therein, at least one inlet opening and at least one outlet opening, a first portion of at least one of the heat transfer conduits being sealingly connected to an inlet opening of the at least one vortex chamber and a second portion of the at least one of the heat transfer conduits being sealingly connected to an outlet opening of the at least one vortex chamber; the vortex chamber having a cross sectional area which is larger than a cross sectional area of the heat transfer conduit to which it is connected.

11. A heat exchanger for a fryer system comprising, in combination:

a first plenum having at least one inlet opening and a plurality of outlet openings;

a mixing plenum having a plurality of inlet openings and a plurality of outlet openings;

a plurality of heat transfer conduits, each heat transfer conduit having an inlet end and an outlet end;

heating means for heating fluid flowing into at least one of the heat transfer conduits; and a first vortex chamber positioned between the plenum and the mixing plenum and having a plurality of baffles disposed therein, a plurality of inlet openings, and a plurality of outlet openings, first portions of respective heat transfer conduits being connected at first ends thereof to respective outlet openings of the first plenum and at second ends thereof to respective inlet openings of the first vortex chamber, second portions of the respective heat transfer conduits being connected at first ends thereof to respective outlet openings of the first vortex chamber and at second ends thereof to respective inlet openings of the mixing plenum;

a second vortex chamber having a plurality of baffles disposed therein, a plurality of inlet openings, and a plurality of outlet openings, first portions of respective heat transfer conduits being connected at first ends thereof to respective outlet openings of the mixing plenum and at second ends thereof to respective inlet openings of the second vortex chamber; second portions of the respective heat transfer conduits being connected at first ends thereof to respective outlet openings of the second vortex chamber.

* * * * *